United States Patent
Bedingfield, Sr. et al.

(10) Patent No.: US 10,200,544 B2
(45) Date of Patent: *Feb. 5, 2019

(54) METHODS, SYSTEMS, AND PRODUCTS FOR SHARING USAGE PLANS

(71) Applicant: AT&T Intellectual Property I, L.P., Atlanta, GA (US)

(72) Inventors: James Carlton Bedingfield, Sr., Lilburn, GA (US); Quenton Lanier Gilbert, Sandy Springs, GA (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/429,237

(22) Filed: Feb. 10, 2017

(65) Prior Publication Data

US 2017/0155519 A1 Jun. 1, 2017

Related U.S. Application Data

(63) Continuation of application No. 14/941,543, filed on Nov. 14, 2015, now Pat. No. 9,596,361, which is a continuation of application No. 14/479,275, filed on Sep. 6, 2014, now Pat. No. 9,215,334, which is a continuation of application No. 13/734,931, filed on Jan. 5, 2013, now Pat. No. 8,855,598, which is a continuation of application No. 12/328,133, filed on Dec. 4, 2008, now Pat. No. 8,374,576.

(51) Int. Cl.
| | |
|---|---|
| *H04W 4/24* | (2018.01) |
| *H04L 12/14* | (2006.01) |
| *H04M 15/00* | (2006.01) |
| *H04W 72/04* | (2009.01) |

(52) U.S. Cl.
CPC ...... *H04M 15/863* (2013.01); *H04L 12/1417* (2013.01); *H04M 15/58* (2013.01); *H04M 15/8066* (2013.01); *H04M 15/844* (2013.01); *H04M 15/846* (2013.01); *H04M 15/852* (2013.01); *H04W 4/24* (2013.01); *H04W 72/042* (2013.01); *H04W 72/0493* (2013.01)

(58) Field of Classification Search
CPC ........... H04L 12/1417; H04M 15/852; H04M 15/844; H04M 2215/2026; H04M 15/00; H04M 17/00; H04M 2215/32; H04M 15/28; H04W 4/24; H04W 4/26; G06Q 20/32
USPC .................................................. 455/405–408
See application file for complete search history.

(56) References Cited

U.S. PATENT DOCUMENTS

| | | |
|---|---|---|
| 5,793,839 A | 8/1998 | Farris et al. |
| 5,970,403 A | 10/1999 | Alperovich et al. |
| 6,965,764 B2 | 11/2005 | Plush |
| 7,167,699 B1 * | 1/2007 | Kretsinger ............ H04M 15/00 370/235 |
| 7,187,761 B2 | 3/2007 | Bookstaff |

(Continued)

*Primary Examiner* — Sharad Rampuria
(74) *Attorney, Agent, or Firm* — Scott P. Zimmerman, PLLC

(57) ABSTRACT

Shared usage plans are popular with families, friends, and small businesses. These shared usage plans share some cumulative utilization of resources, such as communications services. Even though multiple devices may share a monthly allotment of resources, an individual threshold is established for each device. The multiple individual thresholds may then be dynamically regulated to maintain the monthly allotment of resources.

20 Claims, 5 Drawing Sheets

Shared and Individual Resource Usage

(56) References Cited

U.S. PATENT DOCUMENTS

| | | |
|---|---|---|
| 7,197,560 B2 | 3/2007 | Caslin et al. |
| 7,457,609 B2 | 11/2008 | Cai |
| 7,616,746 B2 | 11/2009 | O'Neil |
| 8,588,735 B1 | 11/2013 | Baker et al. |
| 8,903,356 B1 | 12/2014 | Kates |
| 9,723,153 B2 * | 8/2017 | Garg .................... H04M 15/41 |
| 2002/0022989 A1 | 2/2002 | Endo et al. |
| 2002/0126810 A1 | 9/2002 | Hannu |
| 2004/0192367 A1 | 9/2004 | Barros et al. |
| 2005/0053211 A1 | 3/2005 | Bevente |
| 2005/0069112 A1 | 3/2005 | Hlasny |
| 2005/0096010 A1 | 5/2005 | Benco et al. |
| 2005/0246705 A1 | 11/2005 | Etelson et al. |
| 2006/0141994 A1 | 6/2006 | Fratti et al. |
| 2006/0189301 A1 | 8/2006 | Vander Veen et al. |
| 2007/0037562 A1 | 2/2007 | Smith-Kerker et al. |
| 2007/0099609 A1 | 5/2007 | Cai |
| 2008/0313643 A1 | 12/2008 | Longobardi |
| 2010/0022216 A1 * | 1/2010 | Bandera .................. H04W 4/24 |
| | | 455/405 |
| 2010/0035576 A1 | 2/2010 | Jones et al. |
| 2011/0275344 A1 | 11/2011 | Momtahan et al. |
| 2013/0122854 A1 | 5/2013 | Agarwal et al. |
| 2014/0024340 A1 | 1/2014 | Raleigh |
| 2014/0162595 A1 | 6/2014 | Raleigh et al. |
| 2014/0171022 A1 | 6/2014 | Kiene et al. |
| 2014/0179266 A1 * | 6/2014 | Schultz ................... H04W 4/24 |
| | | 455/406 |
| 2015/0271785 A1 | 9/2015 | Rout |
| 2017/0124737 A1 * | 5/2017 | Joseph .................. G06T 11/206 |
| 2018/0262625 A1 * | 9/2018 | McCarley ............. H04M 15/66 |

* cited by examiner

METHODS, SYSTEMS, AND PRODUCTS FOR SHARING USAGE PLANS

CROSS-REFERENCE TO RELATED APPLICATIONS

This application is a continuation of U.S. application Ser. No. 14/941,543 filed Nov. 14, 2015 and since issued as U.S. Pat. No. 9,596,361, which is a continuation of U.S. application Ser. No. 14/479,275 filed Sep. 6, 2014 and since issued as U.S. Pat. No. 9,215,334, which is a continuation of U.S. application Ser. No. 13/734,931 filed Jan. 5, 2013 and since issued as U.S. Pat. No. 8,855,598, which is a continuation of U.S. application Ser. No. 12/328,133 filed Dec. 4, 2008 and since issued as U.S. Pat. No. 8,374,576, with all applications incorporated herein by reference in their entireties.

BACKGROUND

Modern wireless and wireline communications systems provide various types of services to customers, including normal calling, paging, messaging, internet access, etc., where the customer (sometimes referred to as a subscriber) is able to select from a wide range of calling plans for today's mobile phone. Most plans are either post-paid, in which services are provided in a given time period, with the customer being billed at the end of the billing period, or pre-paid type plans in which the customer must pay in advance to ensure communications services are available when subsequently needed. Service providers currently offer a number of calling plans designed to allow subscribers to select the types of services that will be available when using their mobile phone or phones. Most post-paid service plans offer either limited anytime minute plans, for instance, in which the subscriber may use 300, 500, 700, 1,000 minutes at a favorable price within a given billing period, typically a month, as well as unlimited plans. For post-paid plans offering limited anytime minutes, the subscriber can use up to the stated limit at a first rate (often included in a flat rate monthly base charge), after which further minutes are charged at a higher rate, with the bill reflecting any charges for exceeding the minutes limit. For pre-paid plans, the user can make calls until the account balance reaches zero, after which the phone will not work until the subscriber replenishes the account.

Shared subscriber plans or family plans are becoming popular, in which post-paid services are provided for a number of phones, with the costs being billed together. Such plans are typically directed to family groups, friends, small businesses, etc., where the plan holder is allowed to have multiple phones with multiple phone numbers. As with single subscriber plans, the shared subscriber plans may also be provided with unlimited minutes or with a limited number of total anytime minutes for the group as a whole, with overages being reflected on the bill at the end of the month. In many group situations, however, one or a few shared plan members use the majority of the available minutes, with the plan account often incurring excess charges with no control over the overall group usage and no indication of excessive phone use by certain members until the bill is received.

SUMMARY

Some embodiments are directed to a method in which the cumulative utilization of communication system resources by a communication terminal is determined. An alert is generated through the communication terminal in response to the cumulative utilization exceeding a threshold amount.

Some other embodiments are directed to a communication system that includes a core network that transmits an alert message to a communication terminal to trigger an alert therefrom in response to a cumulative utilization of communication system resources by a communication terminal exceeding a threshold value.

Some other embodiments are directed to a computer program product that monitors utilization of communication system resources. The computer program product includes a computer readable medium having computer readable program code embodied therein. The computer readable program code is configured to determine cumulative utilization of communication system resources by a communication terminal, and to generate an alert through the communication terminal in response to the cumulative utilization reaching a threshold amount.

Other systems, methods, and/or computer program products according to other embodiments will be or become apparent to one with skill in the art upon review of the following drawings and detailed description. It is intended that all such additional systems, methods, and/or computer program products be included within this description, be within the scope of the present invention, and be protected by the accompanying claims.

BRIEF DESCRIPTION OF THE DRAWINGS

The accompanying drawings, which are included to provide a further understanding of the invention and are incorporated in and constitute a part of this application, illustrate certain embodiments of the invention. In the drawings.

DETAILED DESCRIPTION

Figure 1:
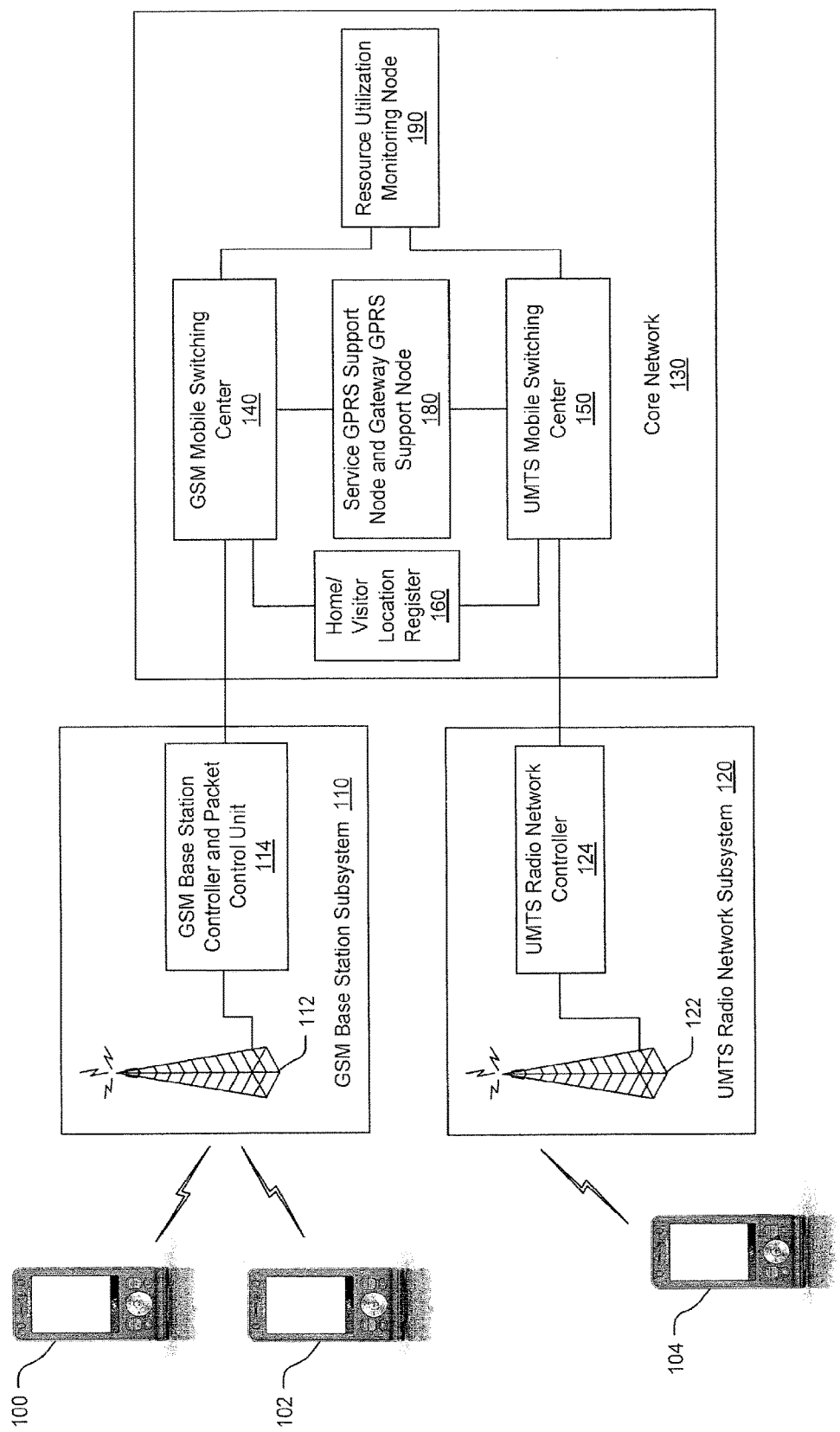
FIG. 1 illustrates a wireless communication system that, according to various embodiments of the present invention, is configured so that the cumulative utilization of communication system resources by mobile communication terminals is tracked by a core network and/or by the mobile communication terminals, and is used to generate alerts from the mobile communication terminals.

Various embodiments now will be described more fully hereinafter with reference to the accompanying drawings, in which illustrative embodiments are shown. However, many different forms may be provided and should not be construed as limited to the embodiments set forth herein. Rather, these embodiments are provided so that this disclosure will be thorough and complete, and will fully convey the scope of various embodiments to those skilled in the art.

It will be understood that when an element is referred to as being "coupled", "connected" or "responsive" to another element, it can be directly coupled, connected or responsive to the other element or intervening elements may also be present. In contrast, when an element is referred to as being "directly coupled", "directly connected" or "directly responsive" to another element, there are no intervening elements present. Like numbers refer to like elements throughout. As used herein the term "and/or" includes any and all combinations of one or more of the associated listed items and may be abbreviated by "/".

It will also be understood that, although the terms first, second, etc. may be used herein to describe various elements, these elements should not be limited by these terms. These terms are only used to distinguish one element from another element.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises," "comprising," "includes" and/or "including" when used herein, specify the presence of stated features, steps, operations, elements, and/or components, but do not preclude the presence or addition of one or more other features, steps, operations, elements, components, and/or groups thereof.

Reference is made below to block diagrams and flowcharts of methods, systems and computer program products according to various embodiments. It will be understood that a block of the block diagrams or flowcharts, and combinations of blocks in the block diagrams or flowcharts, may be implemented at least in part by computer program instructions. These computer program instructions may be provided to one or more enterprise, application, personal, pervasive and/or embedded computer systems, such that the instructions, which execute via the computer system(s) create means, modules, devices or methods for implementing the functions/acts specified in the block diagram block or blocks. A computer program according to embodiments comprises a computer usable storage medium having computer-readable program code embodied therein. Combinations of general purpose computer systems and/or special purpose hardware also may be used in other embodiments.

These computer program instructions may also be stored in memory of the computer system(s) that can direct the computer system(s) to function in a particular manner, such that the instructions stored in the memory produce an article of manufacture including computer-readable program code which implements the functions/acts specified in block or blocks. The computer program instructions may also be loaded into the computer system(s) to cause a series of operational steps to be performed by the computer system(s) to produce a computer implemented process such that the instructions which execute on the processor provide steps for implementing the functions/acts specified in the block or blocks. Accordingly, a given block or blocks of the block diagrams and/or flowcharts provides support for methods, computer program products and/or systems (structural and/or means-plus-function).

It should also be noted that in some alternate implementations, the functions/acts noted in the flowcharts may occur out of the order noted in the flowcharts. For example, two blocks shown in succession may in fact be executed substantially concurrently or the blocks may sometimes be executed in the reverse order, depending upon the functionality/acts involved. Finally, the functionality of one or more blocks may be separated and/or combined with that of other blocks.

Although various embodiments are described in the context of mobile communication terminals for purposes of explanation of various embodiments, however it is to be understood that other embodiments are not limited to such configurations, but is intended to encompass any configuration capable of carrying out at least one of the operational embodiments described herein. As used herein, a "communication terminal" or "terminal" includes, but is not limited to, any electronic device that is configured to communicate via a wireline or wireless interface, such as according to one or more cellular communication protocols. Examples of communications terminals may include, but are not limited to, a cellular wireless terminal; a personal communication terminal that may combine a cellular wireless terminal with data processing, facsimile and/or data communications capabilities; a personal data assistant (PDA) that can include a wireless transceiver, pager, Internet/intranet access, local area network interface, wide area network interface, Web browser, organizer, and/or calendar; and/or a mobile or fixed computer or other device that includes a wireline/wireless communication transceiver.

In accordance with various embodiments, an alert is generated through a communication terminal in response to the communication terminal having used at least a threshold amount of communication system resources. When a plurality of terminals share an allotment of communication system resources under a shared subscriber plan, a core network of the communication system may determine when the terminals have together used at least a threshold amount of communication system resources and, responsive thereto, can transmit an alert message to at least a designated one of the terminals. Alternatively or additionally, some of the terminals may report their individual utilization of communication system resources to a designated another one of the terminals that can then determine when the combine utilization exceeds a threshold value and, responsive thereto, and transmit to those terminals an alert message or other message to control their utilization of communication system resources.

These and other embodiments will now be described to regard to FIGS. 1-9. FIG. 1 illustrates an exemplary wireless communication system that is configured so that the cumulative utilization of communication system resources by mobile communication terminals is tracked by a core network and/or by the mobile communication terminals, and is used to generate alerts from the mobile communication terminals. Referring to FIG. 1, the wireless communication system includes a plurality of wireless communication terminals 100, 102, and 104 that communicate with the same or different radio transceiver subsystems, such as an exemplary Global Standard for Mobile (GSM) base station subsystem 110 and an exemplary Universal Mobile Telecommunications System (UMTS) radio network subsystem 120. The radio transceiver subsystems interconnect a core network 130 to the terminals 100, 102, and 104.

Although exemplary embodiments are described in the context of the terminals 100, 102, and 104 communicating with a GSM and a UMTS subsystem, they are not limited thereto and may additionally or alternatively communicate using any cellular communication protocols such as, for example, GSM, General Packet Radio Service (GPRS), enhanced data rates for GSM evolution (EDGE), Integrated Digital Enhancement Network (iDEN), code division multiple access (CDMA), wideband-CDMA, CDMA2000, and/or UMTS.

The GSM base station subsystem (BSS) 110 can include a GSM base transceiver station (BTS) 112 and a GSM base station controller (BSC) 114 that is configured to carry out radio resource (e.g. time slot) allocation to the mobile terminals 100, 102, and 104, frequency administration, and handover between GSM BTSs controlled by the GSM BSC 114. The GSM BSC 114 can be further configured to manage packet communications, such as via a general packet radio service (GPRS), with the mobile terminals 100, 102, and 104 through the GSM BTS 112.

The UMTS radio network subsystem (RNS) 120 can include a UMTS Node 122 and a UMTS radio network controller (RNC) 124. The UMTS RNC 124 can be configured to carry out radio resource allocation to the mobile terminals 100, 102, and 104, frequency administration, and handover between nodes controlled by the UMTS RNC 124. The UMTS RNC 124 can be configured to manage packet communications, such as via a general packet radio service (GPRS), with the mobile terminals 100, 102, and 104 through the UMTS Node 122.

For convenience of reference, the core network 130 has been illustrated as encompassing various components that are used to provide GSM and UMTS communication services to the terminals 100, 102, and 104. However it is to be understood that in practice some of these components can be arranged in different configurations and operated by different service provider entities. For example, a combined mobile switching center (MSC) and/or a combined service GPRS support node and Gateway GPRS support node (SGSN and GGSN) may service traffic to both the GSM BSS 110 and the UMTS RNS 120.

The exemplary core network 130 may include a GSM mobile switching center (MSC) 140, a SGSN and GGSN 180, a UMTS mobile switching center (MSC) 150, and a home/visitor location register 160. Although separate components have been illustrated in the core network 130 for ease of explanation, it is to be understood that the functionality described herein for these components may be combined within less components or distributed differently among these or other components.

The GSM MSC 140 can set up and switch calls from/to the GSM BSC 114 and a public switched telephone network (PSTN) and/or other networks. The UMTS MSC 150 can similarly set up and switch calls from/to the UMTS RNC 124 and the PSTN and/or other networks. A home/visitor location register 160 can provide routing information for mobile terminated calls and SMS (Short Message Service), and is a database that is responsible for the maintenance of user and visitor subscription information.

The SGSN and GGSN 180 can track the locations of the terminals 100, 102, and 104 and perform security functions and access control (e.g., to enable virtually always connected access to the terminals 100, 102, and 104). The SGSN and GGSN 180 routes packet data between the terminals 100, 102, and 104, via the GSM BSS 110 and/or the UMTS RNS 120, and the Internet and/or other packet networks.

In accordance with some embodiments, the core network 130 can further include a resource utilization monitoring node 190. The monitoring node 190 tracks the individual cumulative utilization of system resources by communication terminals and combines this individual utilization for terminals that are sharing an allotment of communication system resources under a shared subscriber plan. The monitoring node 190 also determines when the combined utilization of system resources by terminals under a shared subscriber plan exceeds a combined threshold value and, responsive thereto, transmits an alert message to at least a designated one of the terminals.

By way of example, assuming that the terminals 100, 102, and 104 are assigned to a shared subscriber plan (e.g., a family plan), where they share a limited number of minutes of talk time for calls, data bytes for Internet or other network data communications, and/or any messages that are included within a monthly renewal price of the shared subscriber plan, the monitoring node 190 can monitor and cause the subscriber of the shared subscriber plan to be billed for excess charges associated with any access utilization of those communication system resources.

In some embodiments, the monitoring node 190 transmits an alert message via the GSM BSS 110 and/or the UMTS RSS 120 to a terminal (e.g., terminal 100) to trigger an alert therefrom in response to the cumulative utilization of communication system resources by the terminal exceeding the threshold value. The monitoring node 190 may determine when the number of data bytes communicated to/from a terminal through the core network 130 exceeds a threshold number of data bytes, may determine when the number of data messages communicated to/from the terminal through the core network 130 exceeds a threshold message number, and/or determine when the number of minutes of talk time for calls by the terminal through the core network 130 exceeds a threshold talk time number and, responsive thereto, can transmit the alert message to the terminal.

When a plurality of terminals, such as terminals 100, 102, and 104, are assigned to shared subscriber plan, the monitoring node 190 can determine when a combination of the cumulative utilization of the communication system resources by those terminals exceeds a combined threshold value and, responsive thereto, can transmit an alert message to at least a designated one of the terminals (e.g., terminal 100 assigned to a person designated in the shared subscriber plan) to trigger an alert therefrom in response to the combined cumulative utilization exceeding the combined threshold value.

By way of example, in response to the terminals 100, 102, and 104 having together sent a threshold number of messages, the monitoring node 190 can transmit an alert message to the designated terminal 100, to another one of the terminals which is determined to have sent the most messages, or to all of the terminals to generate an alert(s) therefrom to warn a user(s) thereof that further use of messaging during a present billing cycle may result in excess charges.

The monitoring node 190 may allocate different amounts of communication system resources two or more different terminals under a shared subscriber plan, and may then dynamically regulate the resources are allocated to some of the terminals in response to utilization levels of one or more other ones of the terminals. For example, the monitoring node 190 may respond to increased utilization of communication system resources by a designated one of the communication terminals by transmitting messages to at least some non-designated ones of the communication terminals to trigger reduction of threshold values that are used in those non-designated ones of the communication terminals to trigger resource utilization alerts.

By way of further example, the terminal 100 may be assigned to a parent while the other terminals 102 and 104 may be assigned to children. As the parent uses the terminal 100 for more text messaging, Internet usage, and/or phone calls, the monitoring node 190 may be configured to transmit messages to the other terminals 102 and 104 to decrease their associated thresholds for the number of data bytes, messages, and/or minutes of talk time that can be used before alerts are generated therefrom.

The monitoring node 190 may be configured to determine a cumulative utilization of the communication system resources by each of a plurality of terminals (e.g., terminals 100, 102, and 104) that share a resource allotment under a shared subscriber plan, and to transmit a message to at least a designated one of the terminals (e.g., terminal 100) that contains information that indicates the cumulative utilization of each of the terminals that are sharing the resource allotment under the shared subscriber plan. The monitoring node 190 may, for example, determine for each of the terminals the number of data bytes communicated through the core network 130 therewith, the number of data messages communicated through the core network 130 therewith, and/or the number of minutes of talk time for calls through the core network 130 therewith. The monitoring node 190 may thereby include the determined number of data byes, data messages, and/or minutes of talk time used by each of the communications in the message that is transmitted to at least the designated one of the communication terminals.

In response to the cumulative utilization exceeding a threshold value, the monitoring node 190 can be triggered to transmit a subscriber plan solicitation message to a designated terminal (e.g., terminal 100) that offers to modify a subscriber plan to increase a present allotment of communication system resources to the terminal under the subscriber plan. The monitoring node 190 may then conditionally increase the allotment of communication system resources under the subscriber plan in response to it receiving a message from the terminal accepting the offered modification of the subscriber plan.

In some embodiments, the monitoring 190 can be configured to transmit a message that contains information that indicates individual cumulative utilizations by the communication terminals associated that are sharing an allotment of communication system resources under a shared subscriber plan. A designated one of the terminals or all of the terminals under the shared subscriber plan can respond to the message by displaying indicia on a display device thereof that illustrates a proportional amount of the shared allotment of communication resources that has been used by itself and the other communication terminals.

Figure 2:
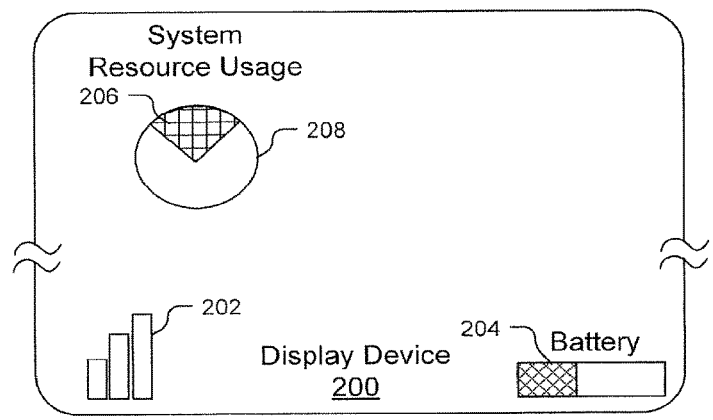
FIG. 2 illustrates various indicia that may be displayed on a display device of a mobile communication terminal, including indicia that indicates utilization of system resources by the mobile communication terminal in accordance with some embodiments.

FIG. 2 illustrates various indicia that may be displayed on a display device 200 of a terminal, including exemplary indicia that indicates its utilization of system resources. Referring to FIG. 2, the terminal may display a bar graph meter 202 that shows the strength of signals being received from a base transceiver station (e.g., the GSM BTS 112 and/or the UMTS Node 122), and may display a battery meter 204 that shows a proportional amount of battery power that is presently remaining.

In accordance with some embodiments, the terminal further displays a system resource usage meter that shows a proportional amount of its allotment of communication resources that it has used. In FIG. 2, the system resource usage meter is a displayed as an exemplary pie chart, with the terminal controlling the arc lengths of a sector 206 of the pie chart that illustrates how much of the system resources (e.g., data bytes, messages, and/or talk time minutes) it has used relative to another sector 208 of the pie chart that illustrates a remaining amount of resources that the terminal is allocated for use under a subscriber plan for a current billing cycle.

Figure 3:
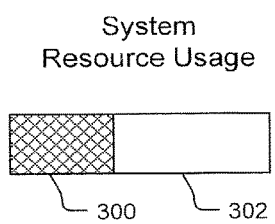
FIGS. 3 and 4 illustrate indicia that may be displayed on a display device of a mobile communication terminal to indicate utilization of system resources by the mobile communication terminal in accordance with some other embodiments.
Figure 4:
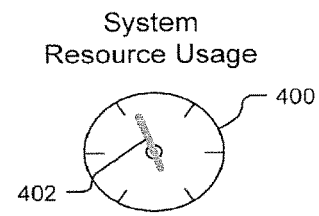

FIGS. 3 and 4 illustrate other exemplary indicia that may be displayed on the display device 200 of a terminal to indicate its utilization of system resources in accordance with some other embodiments. Referring to FIG. 3, the system resource usage meter is a displayed as an exemplary bar chart, with the terminal controlling the length of a portion 300 of a bar that illustrates how much of the system resources (e.g., data bytes, messages, and/or talk time minutes) it has used relative to another portion 302 of the bar that illustrates a remaining amount of resources that the terminal is allocated for use under a subscriber plan for a current billing cycle.

Referring to FIG. 4, the system resource usage meter is a displayed as an exemplary gauge 400 with a hand 402 that rotates how much of the system resources (e.g., data bytes, messages, and/or talk time minutes) have been used by the terminal and how much remains under a subscriber plan for a current billing cycle.

In some further embodiments, a terminal receives information contained in a message from the monitoring node 190 that indicates individual cumulative utilizations by itself and other terminals that are sharing an allotment of communication system resources under a shared subscriber plan, and/or generates such information as will be described further below. The terminal responds thereto by displaying indicia on a display device that illustrates a proportional amount of the shared allotment of communication resources that has been used by itself and other terminals.

Figure 5:
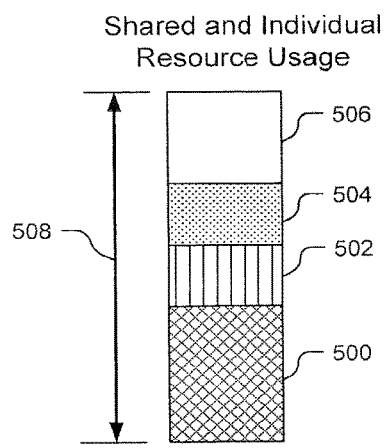
FIGS. 5 and 6 illustrate indicia that may be displayed on a display device of one or more mobile communication terminals that share a resource allotment under a shared subscriber plan to indicate their individual and shared utilization of system resources in accordance with some other embodiments.
Figure 6:
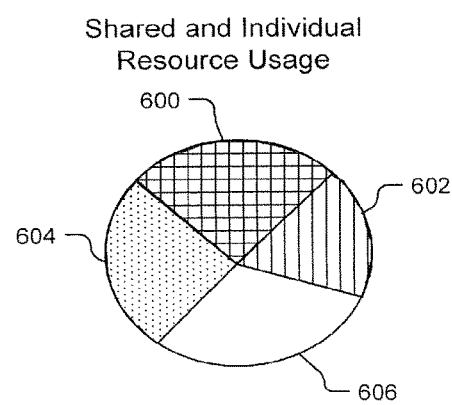

FIGS. 5 and 6 illustrate exemplary indicia that may be displayed on a display device of one or more mobile communication terminals that share a resource allotment under a shared subscriber plan to indicate their individual and shared utilization of system resources in accordance with some other embodiments. Referring to FIG. 5, a terminal displays a bar chart on the display device 200 and controls lengths of the rectangular bars that are assigned to different ones of the terminals to illustrate the proportional amount of the total shared allotment 508 of communication resources that has been used by itself and the other respective terminals. For example, the bar 500 may show the amount of resources (e.g., data bytes, messages, and/or talk time minutes) used by the terminal 100. The bars 502 and 504 may similarly show the amount of resources used by the terminals 102 and 104, respectively. The bar 506 may show the remaining resources are available under a shared subscriber plan for a current billing cycle. In one embodiment, the proportional size/shape of the displayed indicia can be normalized on a net cost basis, or some other defined basis. Accordingly, the various indicia representing minutes of use and data bytes can be displayed on a common graph with their sizes/shapes being normalized based on their respective costs to the subscriber.

Referring to FIG. 6, a terminal displays a pie chart on the display device 200 and controls arc lengths of the sectors that are assigned to different ones of the terminals to illustrate the proportional amount of the shared allotment of communication resources that has been used by itself and the other respective terminals. For example, the sector 600 may show the amount of resources (e.g., data bytes, messages, and/or talk time minutes) used by the terminal 100. The sectors 602 and 604 may similarly show the amount of resources used by the terminals 102 and 104, respectively. The sector 606 may show the remaining resources are available under the shared subscriber plan for the current billing cycle.

The terminal may be configured to display separate indicia that illustrate a proportional amount of the shared allotment of data bytes, a proportional amount of the shared allotment of data messages, and a proportional amount of the shared allotment of minutes of talk time that has been used by itself and each of the communication terminals. Thus, for example, the terminal may display a plurality of the bar charts, the pie graphs, and/or other meters that illustrate amounts of different types of resources that have been used by itself and other communication terminals under the shared subscriber plan.

The monitoring node 190 may transmit a reset message to a designated one of the terminals or all of the terminals under the shared subscriber plan to indicate that a new billing cycle is starting and to, thereby, cause the receiving terminals to reset any counters therein that track the cumulative utilization of system resources by themselves and the other terminals under the shared subscriber plan.

In some other embodiments, a terminal may be configured to receive resource reporting messages from a plurality of other communication terminals that collectively share an allotment of communication resources under a shared subscriber plan. The resource reporting messages can indicate individual utilizations by those communication terminals of the shared allotment of communication resources. The terminal may be configured to display indicia on a display device that illustrates a proportional amount of the shared allotment of communication resources that has been used by itself and the other communication terminals.

In response to a combination of indicated individual utilizations by the other communication terminals of the shared allotment of communication resources exceeding a combined threshold value, the terminal may transmit an alert message to the other terminals that are sharing resources under a subscriber plan to trigger an alert therefrom. The terminal may, for example, transmit a resource restriction message to the other terminals to trigger a reduction of threshold values, which are used in those communication terminals to trigger resource utilization alerts.

Figure 7:
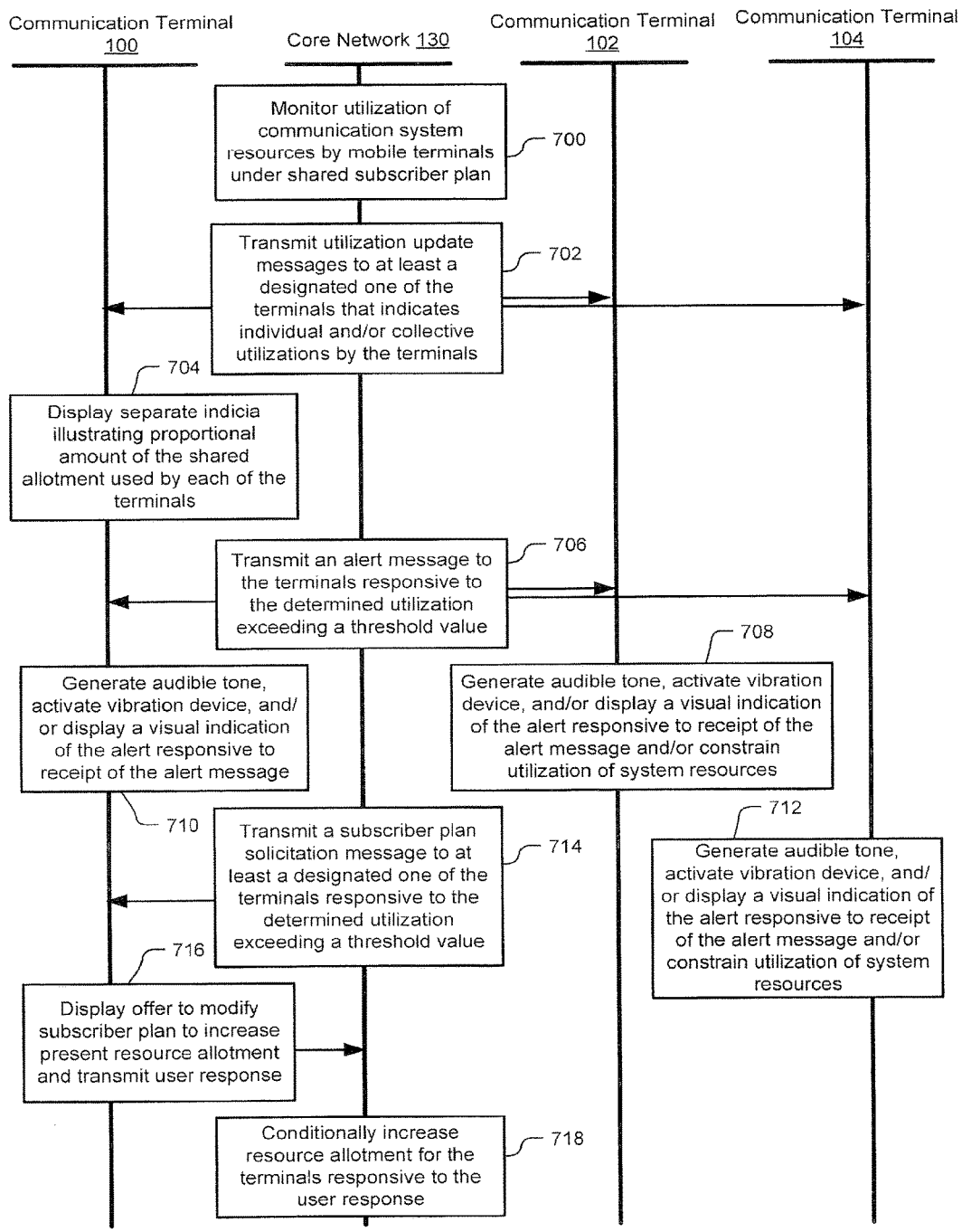
FIG. 7 illustrates a data flow diagram and flowchart of operations that may be carried out by the exemplary mobile communication terminals and the core network shown in FIG. 1 to monitor and report individual and shared utilization of system resources and to generate alerts responsive thereto in accordance with some embodiments of the present invention.

FIG. 7 illustrates a data flow diagram and flowchart of operations that may be carried out by the exemplary mobile communication terminals 100, 102, and 104 and by the core network 130 shown in FIG. 1 to monitor and report individual and shared utilization of system resources and to generate alerts responsive thereto in accordance with some embodiments of the present invention. Referring to FIG. 7, the core network 130 monitors (block 700) the utilization of communication system resources by the mobile terminals 100, 102, and 104, which are sharing resources under a shared subscriber plan. The core network 130 transmits (block 702) utilization update messages to at least designate one of the terminals (e.g. terminal 100) and/or to all of the terminals 100, 102, and 104 that indicates their individual and/or collective utilizations of system resources.

The terminals 100, 102, and 104 receiving the utilization update messages may display (block 704) separate indicia on a display device thereof that illustrates a proportional amount of the shared allotment of resources that has been used by each of the terminals.

In response to the core network 130 determining that the individual and/or collective utilization of resources by one or more of the terminals 100, 102, and 104 has exceeded a threshold value, the core network 130 transmits (block 706) an alert message to the terminals 100, 102, and 104. The terminals 100, 102, and 104 can respond to the alert message by generating (blocks 708, 710, and 712) an audible tone, activating a vibration device, and/or displaying a visual indication of the alert.

The core network 130 may also respond to the individual and/or collective resource utilizations by transmitting (block 714) a subscriber plan solicitation message to at least a designated one of the terminals (e.g., one of the terminals assigned to a parent in a family share plan) to offer to modify the subscriber plan to increase a present allotment of communication system resources to the communication terminal under the subscriber plan (e.g., increase the number of data megabytes, messages, and/or talk time minutes that are included within the subscriber plan). The terminal 100 can respond (block 716) by displaying the offer and transmitting back to the core network 130 any user response thereto. The core network 130 can conditionally increase the allotment of communication system resources under the subscriber plan in response (block 718) to a message received from the terminal 100 accepting the offered modification of the subscriber plan.

Figure 8:
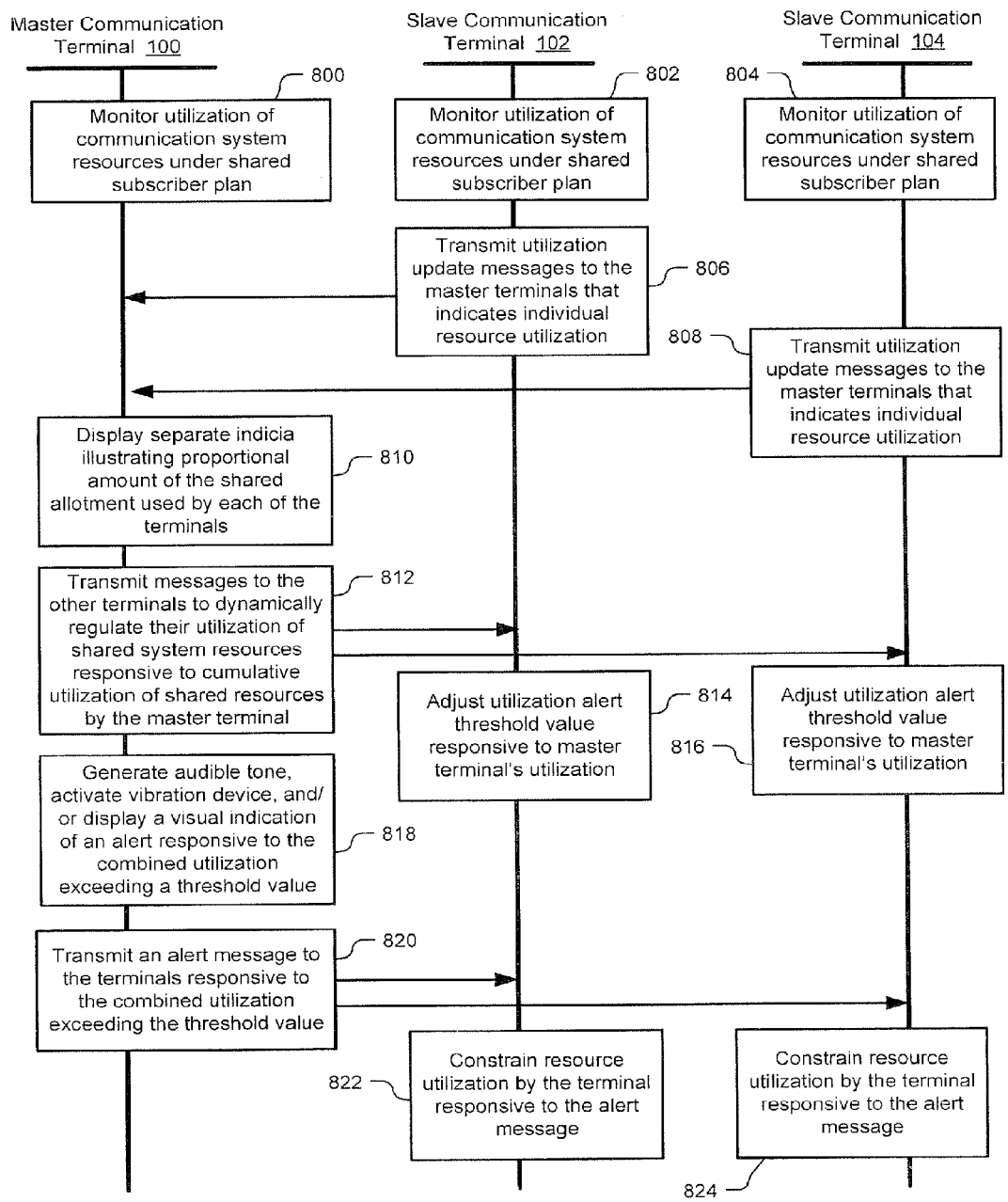
FIG. 8 illustrates a data flow diagram and flowchart of operations that may be carried out by the exemplary mobile communication terminals shown in FIG. 1 to monitor and report individual and shared utilization of system resources and to generate alerts responsive thereto in accordance with some embodiments of the present invention.

FIG. 8 illustrates a data flow diagram and flowchart of operations that may be carried out by the exemplary terminals 100, 102, and 104 shown in FIG. 1 to monitor and report individual and shared utilization of system resources and to generate alerts responsive thereto in accordance with some embodiments of the present invention. Referring to FIG. 8, the terminal 100 can operate as a master and other terminals 102 and 104 can operate as slave terminals under a shared subscriber plan.

Each of the terminals 100, 102, 104 can monitor (blocks 800, 802, and 804) their individual utilization of system resources under the shared subscriber plan. The slave terminals 102 and 104 can transmit (blocks 806 and 808) utilization update messages to the master terminal 100 that indicates their individual resource utilization (e.g. how many data bytes, messages, and/or minutes of talk time they have individually used).

The master terminal 100 can display (block 810) separate indicia that illustrates the portion that will amount of the shared allotment of system resources under the shared subscriber plan to each of the terminals has individually and/or collectively used. The master terminal 100 can transmit (block 812) messages to the slave terminals 102 and 104 to dynamically regulate their utilization of shared system resources responsive to the utilization of shared resources by the master terminal 100. The slave terminals 102 and 104 can respond to such messages by adjusting (blocks 814 and 816) their utilization alert threshold values, which they compare to their individual resource utilizations to decide when to generate an alarm therefrom.

Accordingly, in response to a parent using more of the allotted messaging under a family subscriber plan, the master terminal 100 that is assigned to a parent can automatically transmit messages to the slave terminals 102 and 104 to lower their message allotment under the family subscriber plan. For example, the slave terminals 102 and 104 may lower the threshold value that is compared to the number of messages they can transmit/receive before an alarm is generated therefrom.

The master terminal 100 can generate (block 818) an audible tone, activate a vibration device, and/or display a visual indication of an alert in response to the combined utilization exceeding a threshold value. The master terminal 100 can transmit (block 820) an alert message to the slave terminals 102 and 104 in response to the combined utilization exceeding the threshold value. The slave terminals 102 and 104 may respond to the alert message by constraining (blocks 822 and 824) their resource utilizations.

Thus, for example, the master terminal 100 can use the reporting messages from the slave terminals 102 and 104 to determine when the combined utilization exceeds a threshold value. Responsive thereto, the master terminal 100 can cause the slave terminals 102 and 104 to restrict further use of those resources, such as by preventing any use of data traffic, messaging, and/or talk time, and/or by restricting such use to messaging addresses, websites, and/or to telephone numbers that have been designated as being permissive for continued use after the resource threshold has been exceeded.

Figure 9:
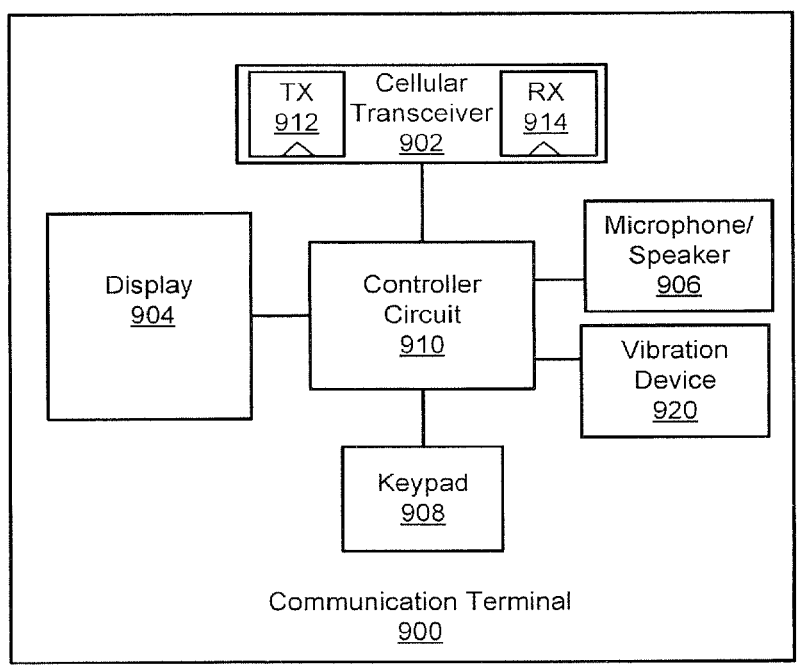
FIG. 9 illustrates an exemplary block diagram of circuitry of the wireless communication terminal shown in FIG. 1 in accordance with some embodiments of the present invention.

FIG. 9 illustrates an exemplary block diagram of circuitry that may be included in one or more of the wireless communication terminals 100, 102, and/or 104 shown in FIG. 1 in accordance with some embodiments of the present invention. Referring to FIG. 9, a communication terminal 900 includes a cellular transceiver 902, a display device 904, a microphone/speaker 906, a keypad 908, a vibration device 920, and a controller circuit 910 that may control operation of these components of the communication terminal 900.

The transceiver 902 typically includes a transmitter circuit 912 and a receiver circuit 914, which cooperate to transmit and receive radio frequency signals. The controller 910 can be configured to encode/decode and control communications according to one or more cellular protocols, which may include, but are not limited to, GSM communication, GPRS, EDGE, CDMA, wideband-CDMA, CDMA2000, and/or UMTS. The controller 910 may alternatively or additionally encode/decode and control communications according to one or more short range communication protocols, which may include, but are not limited to Bluetooth and/or WiFi such as IEEE 802.11 (e.g., IEEE 802.11b-g).

In the drawings and specification, there have been disclosed embodiments and, although specific terms are employed, they are used in a generic and descriptive sense only and not for purposes of limitation, the scope of the invention being set forth in the following claims.

The invention claimed is:

1. A method, comprising:
   identifying, by a server, multiple identifiers associated with multiple devices sharing a plan of usage;
   querying, by the server, an electronic database for each one of the multiple identifiers, the electronic database electronically associating shares in the plan of usage to the multiple identifiers;
   identifying, by the server, each share of the shares in the electronic database that is electronically associated with each identifier of the multiple identifiers sharing the plan of usage;
   determining, by the server, individual usages associated with the multiple devices sharing the plan of usage;
   comparing, by the server, the shares in the plan of usage to the individual usages associated with the multiple devices; and
   generating, by the server, a short messaging system text message in response to any one of the individual usages exceeding a corresponding one of the shares.

2. The method of claim 1, further comprising determining a number associated with a device of the multiple devices.

3. The method of claim 2, further comprising sending the short messaging system text message to the number associated with the device.

4. The method of claim 2, further comprising wirelessly transmitting the short messaging system text message to the number.

5. The method of claim 1, further comprising determining numbers associated with all devices of the multiple devices.

6. The method of claim 5, further comprising sending the short messaging system text message to the numbers associated with the multiple devices.

7. The method of claim 1, further comprising determining a number associated with any device of the multiple devices.

8. The method of claim 7, further comprising sending the short messaging system text message to the number.

9. A system, comprising:
   a hardware processor; and
   a memory device, the memory device storing code, the code when executed causing the hardware processor to perform operations, the operations comprising:
   identifying multiple devices sharing a plan of usage;
   querying an electronic database for an identifier associated with each one of the multiple devices, the electronic database electronically associating shares of the plan of usage to identifiers associated with the multiple devices sharing the plan of usage;
   retrieving each share of the shares in the electronic database that is electronically associated with the identifier associated with the each one of the multiple devices;
   determining individual usages associated with the multiple devices sharing the plan of usage;
   comparing the each share to a corresponding one of the individual usages associated with the multiple devices sharing the plan of usage; and
   generating a short messaging system text message in response to any of the individual usages exceeding a corresponding share.

10. The system of claim 9, wherein the operations further comprise determining a number associated with a device of the multiple devices sharing the plan of usage.

11. The system of claim 10, wherein the operations further comprise sending the short messaging system text message to the number associated with the device sharing the plan of usage.

12. The system of claim 10, wherein the operations further comprise wirelessly transmitting the short messaging system text message to the number associated with the device sharing the plan of usage.

13. The system of claim 9, wherein the operations further comprise determining numbers associated with all devices of the multiple devices sharing the plan of usage.

14. The system of claim 13, wherein the operations further comprise sending the short messaging system text message to the numbers associated with the multiple devices sharing the plan of usage.

15. The system of claim 9, wherein the operations further comprise determining a number associated with any device of the multiple devices sharing the plan of usage.

16. The system of claim 15, wherein the operations further comprise sending the short messaging system text message to the number associated with the any device sharing the plan of usage.

17. A memory device storing instructions that when executed cause a hardware processor to perform operations, the operations comprising:
 identifying multiple devices sharing a plan of usage;
 querying an electronic database for an identifier associated with each one of the multiple devices, the electronic database electronically associating shares of the plan of usage to identifiers associated with the multiple devices;
 retrieving the shares in the electronic database that are electronically associated with the identifiers associated with the multiple devices;
 determining individual usages associated with the multiple devices sharing the plan of usage;
 comparing the individual usages to the shares retrieved from the electronic database; and
 generating a short messaging system text message in response to any one of the individual usages exceeding a corresponding one of the shares.

18. The memory device of claim 17, wherein the operations further comprise determining a number associated with a device of the multiple devices sharing the plan of usage.

19. The memory device of claim 18, wherein the operations further comprise sending the short messaging system text message to the number associated with the device sharing the plan of usage.

20. The memory device of claim 17, wherein the operations further comprise sending the short messaging system text message to any number associated with the multiple devices sharing the plan of usage.

* * * * *